United States Patent
Ganzel et al.

(10) Patent No.: US 10,814,855 B1
(45) Date of Patent: Oct. 27, 2020

(54) FLUID RESERVOIR LEVEL FLOAT MECHANISM AND METHOD OF DETECTING PROPER OPERATION THEREOF

(71) Applicant: ZF Active Safety US Inc., Livonia, MI (US)

(72) Inventors: Blaise Ganzel, Ann Arbor, MI (US); Mikel Esandi Murguialday, Livonia, MI (US)

(73) Assignee: ZF Active Safety US Inc., Livonia, MI (US)

( * ) Notice: Subject to any disclaimer, the term of this patent is extended or adjusted under 35 U.S.C. 154(b) by 0 days.

(21) Appl. No.: 16/544,080

(22) Filed: Aug. 19, 2019

(51) Int. Cl.
*B60R 25/102* (2013.01)
*B60T 17/22* (2006.01)
*F16K 33/00* (2006.01)
*F16K 21/18* (2006.01)
*B60T 13/68* (2006.01)

(52) U.S. Cl.
CPC .......... *B60T 17/225* (2013.01); *F16K 21/185* (2013.01); *F16K 33/00* (2013.01); *B60T 13/686* (2013.01)

(58) Field of Classification Search
None
See application file for complete search history.

(56) References Cited

U.S. PATENT DOCUMENTS

| | | | |
|---|---|---|---|
| 3,710,612 A * | 1/1973 | Innes | F22B 37/425 73/432.1 |
| 3,710,613 A * | 1/1973 | Innes | F22B 37/425 335/205 |
| 4,321,590 A | 3/1982 | Ishikawa | |
| 4,626,700 A | 12/1986 | Tanaka | |
| 4,821,022 A | 4/1989 | Jannotta | |
| 5,150,614 A | 9/1992 | Urich | |
| 7,632,399 B2 * | 12/2009 | Geppert | B03D 1/22 210/127 |
| 2003/0029223 A1 | 2/2003 | Taylor | |

* cited by examiner

*Primary Examiner* — Brent Swarthout
(74) *Attorney, Agent, or Firm* — Gigette M. Bejin

(57) ABSTRACT

A fluid level detector assembly is used to determine the level of fluid in a tank. The assembly includes a float movably mounted within the tank which corresponds to the level of fluid within the tank. The fluid level detector assembly further includes a sensor assembly for detecting movement of the float, and a mechanism for causing movement of the float hydraulically.

3 Claims, 7 Drawing Sheets

FLUID RESERVOIR LEVEL FLOAT MECHANISM AND METHOD OF DETECTING PROPER OPERATION THEREOF

BACKGROUND OF THE INVENTION

This invention relates in general to vehicle braking systems. Vehicles are commonly slowed and stopped with hydraulic brake systems. These systems vary in complexity but a base brake system typically includes a brake pedal, a tandem master cylinder, fluid conduits arranged in two similar but separate brake circuits, and wheel brakes in each circuit. The driver of the vehicle operates a brake pedal which is connected to the master cylinder. When the brake pedal is depressed, the master cylinder generates hydraulic forces in both brake circuits by pressurizing brake fluid. The pressurized fluid travels through the fluid conduit in both circuits to actuate brake cylinders at the wheels to slow the vehicle.

Base brake systems typically use a brake booster which provides a force to the master cylinder which assists the pedal force created by the driver. The booster can be vacuum or hydraulically operated. A typical hydraulic booster generates pressurized fluid for assisting in pressurizing the wheel brakes, thereby increasing the pressures generated by the master cylinder.

Braking a vehicle in a controlled manner under adverse conditions requires precise application of the brakes by the driver. Under these conditions, a driver can easily apply excessive braking pressure thus causing one or more wheels to lock, resulting in excessive slippage between the wheel and road surface. Such wheel lock-up conditions can lead to greater stopping distances and possible loss of directional control. Advances in braking technology have led to the introduction of Anti-lock Braking Systems (ABS). An ABS system monitors wheel rotational behavior and selectively applies and relieves brake pressure in the corresponding wheel brakes in order to maintain the wheel speed within a selected slip range to achieve maximum braking force. While such systems are typically adapted to control the braking of each braked wheel of the vehicle, some systems have been developed for controlling the braking of only a portion of the plurality of braked wheels.

Electronically controlled ABS valves, comprising apply valves and dump valves, are located between the master cylinder and the wheel brakes. The ABS valves regulate the pressure between the master cylinder and the wheel brakes. Typically, when activated, these ABS valves operate in three pressure control modes: pressure apply, pressure dump and pressure hold. The apply valves allow pressurized brake fluid into respective ones of the wheel brakes to increase pressure during the apply mode, and the dump valves relieve brake fluid from their associated wheel brakes during the dump mode. Wheel brake pressure is held constant during the hold mode by closing both the apply valves and the dump valves.

To achieve maximum braking forces while maintaining vehicle stability, it is desirable to achieve optimum slip levels at the wheels of both the front and rear axles. During vehicle deceleration different braking forces are required at the front and rear axles to reach the desired slip levels. Therefore, the brake pressures should be proportioned between the front and rear brakes to achieve the highest braking forces at each axle. ABS systems with such ability, known as Dynamic Rear Proportioning (DRP) systems, use the ABS valves to separately control the braking pressures on the front and rear wheels to dynamically achieve optimum braking performance at the front and rear axles under the then current conditions.

A further development in braking technology has led to the introduction of Traction Control (TC) systems. Typically, valves have been added to existing ABS systems to provide a brake system which controls wheel speed during acceleration. Excessive wheel speed during vehicle acceleration leads to wheel slippage and a loss of traction. An electronic control system senses this condition and automatically applies braking pressure to the wheel cylinders of the slipping wheel to reduce the slippage and increase the traction available. In order to achieve optimal vehicle acceleration, pressurized brake fluid is made available to the wheel cylinders even if the master cylinder is not actuated by the driver.

During vehicle motion such as cornering, dynamic forces are generated which can reduce vehicle stability. A Vehicle Stability Control (VSC) brake system improves the stability of the vehicle by counteracting these forces through selective brake actuation. These forces and other vehicle parameters are detected by sensors which signal an electronic control unit. The electronic control unit automatically operates pressure control devices to regulate the amount of hydraulic pressure applied to specific individual wheel brakes. In order to achieve optimal vehicle stability, braking pressures greater than the master cylinder pressure must quickly be available at all times.

Various braking systems have been developed to handle these complex braking maneuvers such as ABS, TC, and VSC. Some of these modern brake systems may include a plunger assembly having a linear actuator which controls a piston to pressurize a fluid chamber for providing a source of pressurized fluid to the brake system. The linear actuator can be rapidly controlled to provide the pressure forces necessary to actuate the wheel brakes. The plunger assembly is in fluid communication with the brake system's fluid reservoir. Under certain failure modes of the brake system, such as a fluid leak, the plunger assembly or other components of the brake system may utilize fluid from the fluid reservoir instead of the normal regulation of fluid between the wheel brakes and the plunger assembly. The reservoir includes one or more fluid level float mechanisms to monitor the fluid level within the reservoir. The fluid level within the reservoir is usually monitored continuously during the lifespan of the brake system. Due to a possible requirement of engaging the brake system into a desired failure mode requiring a relatively large amount of fluid from the reservoir, it is generally important to make sure the fluid level float mechanisms are operating properly to assure that the brake system is reading the actual fluid level within the fluid reservoir. Therefore, it is desirable to provide a system of monitoring the proper operation of the fluid level float mechanisms.

SUMMARY OF THE INVENTION

The invention relates to a fluid level detector assembly which is used to determine the level of fluid in a tank. The assembly includes a float movably mounted within the tank which corresponds to the level of fluid within the tank. The fluid level detector assembly further includes a sensor assembly for detecting movement of the float, and a mechanism for causing movement of the float hydraulically.

The invention also relates to a method of determining the proper operation of a fluid level detector assembly. The method comprises the step of providing a fluid level detector assembly having a float and a sensor assembly. The float is moved hydraulically. A sensor assembly senses movement of the float, thereby detecting proper operation of the fluid level detector assembly.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
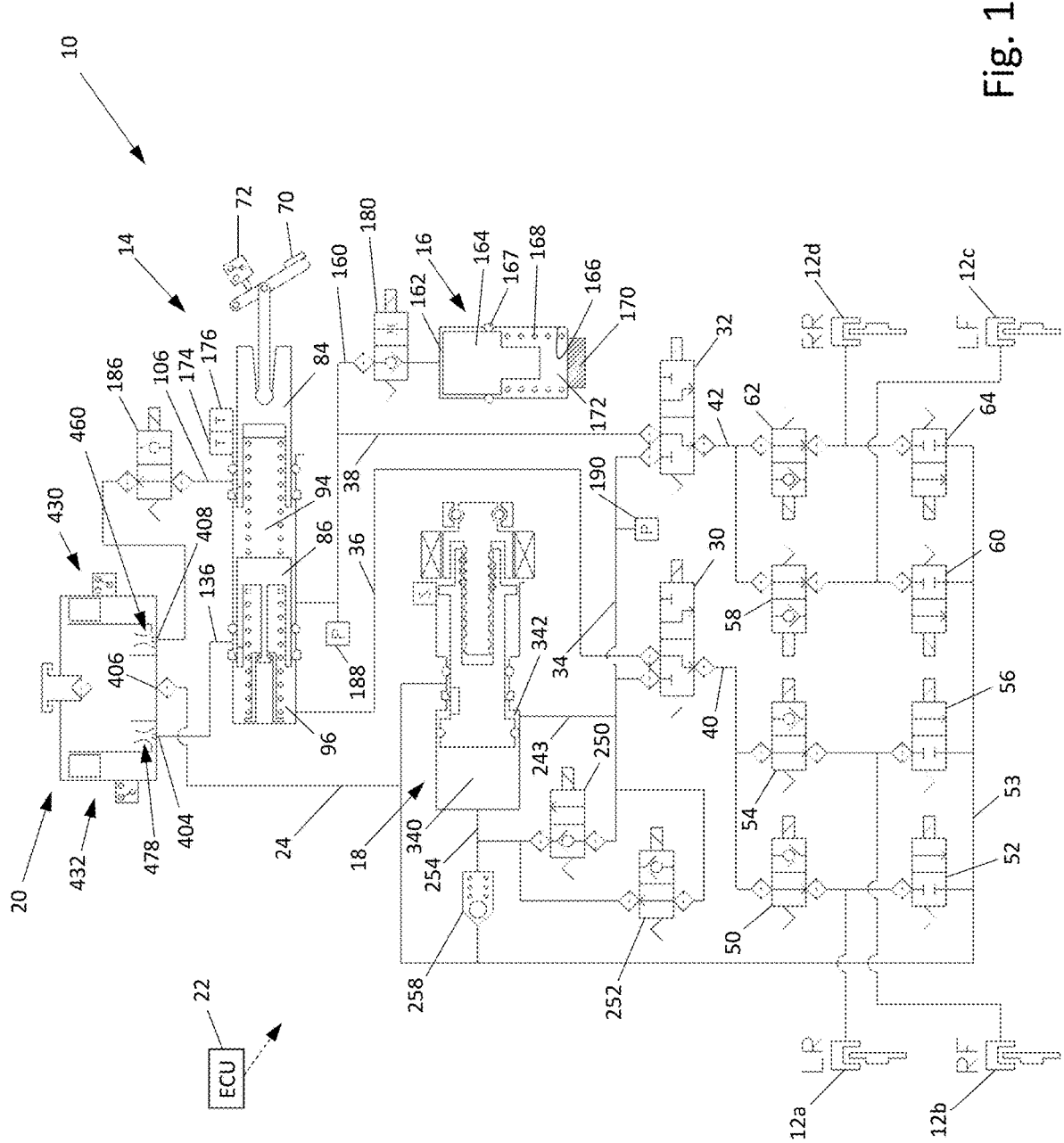
FIG. 1 is a schematic illustration of a first embodiment of a brake system.

Referring now to the drawings, there is schematically illustrated in FIG. 1 a first embodiment of a vehicle brake system, indicated generally at 10. The brake system 10 is a hydraulic braking system in which fluid pressure from a source is operated to apply braking forces for the brake system 10. The brake system 10 may suitably be used on a ground vehicle such as an automotive vehicle having four wheels. Furthermore, the brake system 10 can be provided with other braking functions such as anti-lock braking (ABS) and other slip control features to effectively brake the vehicle, as will be discussed below. In the illustrated embodiment of the brake system 10, there are four wheel brakes 12a, 12b, 12c, and 12d. The wheel brakes 12a, 12b, 12c, and 12d can have any suitable wheel brake structure operated by the application of pressurized brake fluid. The wheel brakes 12a, 12b, 12c, and 12d may include, for example, a brake caliper mounted on the vehicle to engage a frictional element (such as a brake disc) that rotates with a vehicle wheel to effect braking of the associated vehicle wheel. The wheel brakes 12a, 12b, 12c, and 12d can be associated with any combination of front and rear wheels of the vehicle in which the brake system 10 is installed. A diagonally split brake system is illustrated such that the wheel brake 12a is associated with the left rear wheel, the wheel brake 12b is associated with the right front wheel, the wheel brake 12c is associated with the left front wheel, and the wheel brake 12d is associated with the right rear wheel. Alternatively for a vertically split system, the wheel brakes 12a and 12b may be associated with the front wheels, and the wheel brakes 12c and 12d may be associated with the rear wheels.

The brake system 10 includes a master cylinder, indicated generally at 14, a pedal simulator, indicated generally at 16, a plunger assembly, indicated generally at 18, and a fluid reservoir, indicated generally at 20. The reservoir 20 stores and holds hydraulic fluid for the brake system 10. The fluid within the reservoir 20 is preferably held at or about atmospheric pressure but may store the fluid at other pressures if so desired. As will be discussed in detail below, the reservoir 20 may include one or more fluid level sensors for detecting the fluid level within the reservoir 20. As will also be discussed in detail below, the plunger assembly 18 of the brake system 10 functions as a source of pressure to provide a desired pressure level to the wheel brakes 12a, 12b, 12c, and 12d during a typical or normal brake apply. Fluid from the wheel brakes 12a, 12b, 12c, and 12d may be returned to the plunger assembly 18 and/or diverted to the reservoir 20.

The brake system 10 includes an electronic control unit (ECU) 22. The ECU 22 may include microprocessors. The ECU 22 receives various signals, processes signals, and controls the operation of various electrical components of the brake system 10 in response to the received signals. The ECU 22 can be connected to various sensors such as pressure sensors, travel sensors, switches, wheel speed sensors, and steering angle sensors. The ECU 22 may also be connected to an external module (not shown) for receiving information related to yaw rate, lateral acceleration, longitudinal acceleration of the vehicle such as for controlling the brake system 10 during vehicle stability operation. Additionally, the ECU 22 may be connected to the instrument cluster for collecting and supplying information related to warning indicators such as an ABS warning light, a brake fluid level warning light, and a traction control/vehicle stability control indicator light.

The brake system 10 further includes first and second isolation valves 30 and 32. The isolation valves 30 and 32 may be solenoid actuated three-way valves. The isolation valves 30 and 32 are generally operable to two positions, as schematically shown in FIG. 1. The first and second isolation valves 30 and 32 each have a port in selective fluid communication with an output conduit 34 generally in communication with an output of the plunger assembly 18, as will be discussed below. The first and second isolation valves 30 and 32 also includes ports that are selectively in fluid communication with conduits 36 and 38, respectively, when the first and second isolation valves 30 and 32 are non-energized, as shown in FIG. 1. The first and second isolation valves 30 and 32 further include ports that are in fluid communication with conduits 40 and 42, respectively, which provide fluid to and from the wheel brakes 12a, 12b, 12c, and 12d.

In a preferred embodiment, the first and/or second isolation valves 30 and 32 may be mechanically designed such that flow is permitted to flow in the reverse direction (from the conduit 34 to the conduits 36 and 38, respectively) when in their de-energized positions and can bypass the normally closed seat of the valves 30 and 32. Thus, although the 3-way valves 30 and 32 are not shown schematically to indicate this fluid flow position, it is noted that that the valve design may permit such fluid flow. This may be helpful in performing self-diagnostic tests of the brake system 10.

The system 10 further includes various solenoid actuated valves (slip control valve arrangement) for permitting controlled braking operations, such as ABS, traction control, vehicle stability control, and regenerative braking blending. A first set of valves includes a first apply valve 50 and a first dump valve 52 in fluid communication with the conduit 40 for cooperatively supplying fluid received from the first isolation valve 30 to the wheel brake 12a, and for cooperatively relieving pressurized fluid from the wheel brake 12a to a reservoir conduit 53 in fluid communication with the reservoir 20. A second set of valves includes a second apply valve 54 and a second dump valve 56 in fluid communication with the conduit 40 for cooperatively supplying fluid received from the first isolation valve 30 to the wheel brake 12b, and for cooperatively relieving pressurized fluid from the wheel brake 12b to the reservoir conduit 53. A third set of valves includes a third apply valve 58 and a third dump valve 60 in fluid communication with the conduit 42 for cooperatively supplying fluid received from the second isolation valve 32 to the wheel brake 12c, and for cooperatively relieving pressurized fluid from the wheel brake 12c to the reservoir conduit 53. A fourth set of valves includes a fourth apply valve 62 and a fourth dump valve 64 in fluid communication with the conduit 42 for cooperatively supplying fluid received from the second isolation valve 32 to the wheel brake 12d, and for cooperatively relieving pressurized fluid from the wheel brake 12d to the reservoir conduit 53. Note that in a normal braking event, fluid flows through the non-energized open apply valves 50, 54, 58, and 62. Additionally, the dump valves 52, 56, 60, and 64 are preferably in their non-energized closed positions to prevent the flow of fluid to the reservoir 20.

The master cylinder 14 is connected to a brake pedal 70 and is actuated by the driver of the vehicle as the driver presses on the brake pedal 70. A brake sensor or switch 72 may be connected to the ECU 22 to provide a signal indicating a depression of the brake pedal 70. As will be discussed below, the master cylinder 14 may be used as a back-up source of pressurized fluid to essentially replace the normally supplied source of pressurized fluid from the plunger assembly 18 under certain failed conditions of the brake system 10. The master cylinder 14 can supply pressurized fluid in the conduits 36 and 38 (that are normally closed off at the first and second isolation valves 30 and 32 during a normal brake apply) to the wheel brake 12a, 12b, 12c, and 12d as required.

Figure 2:
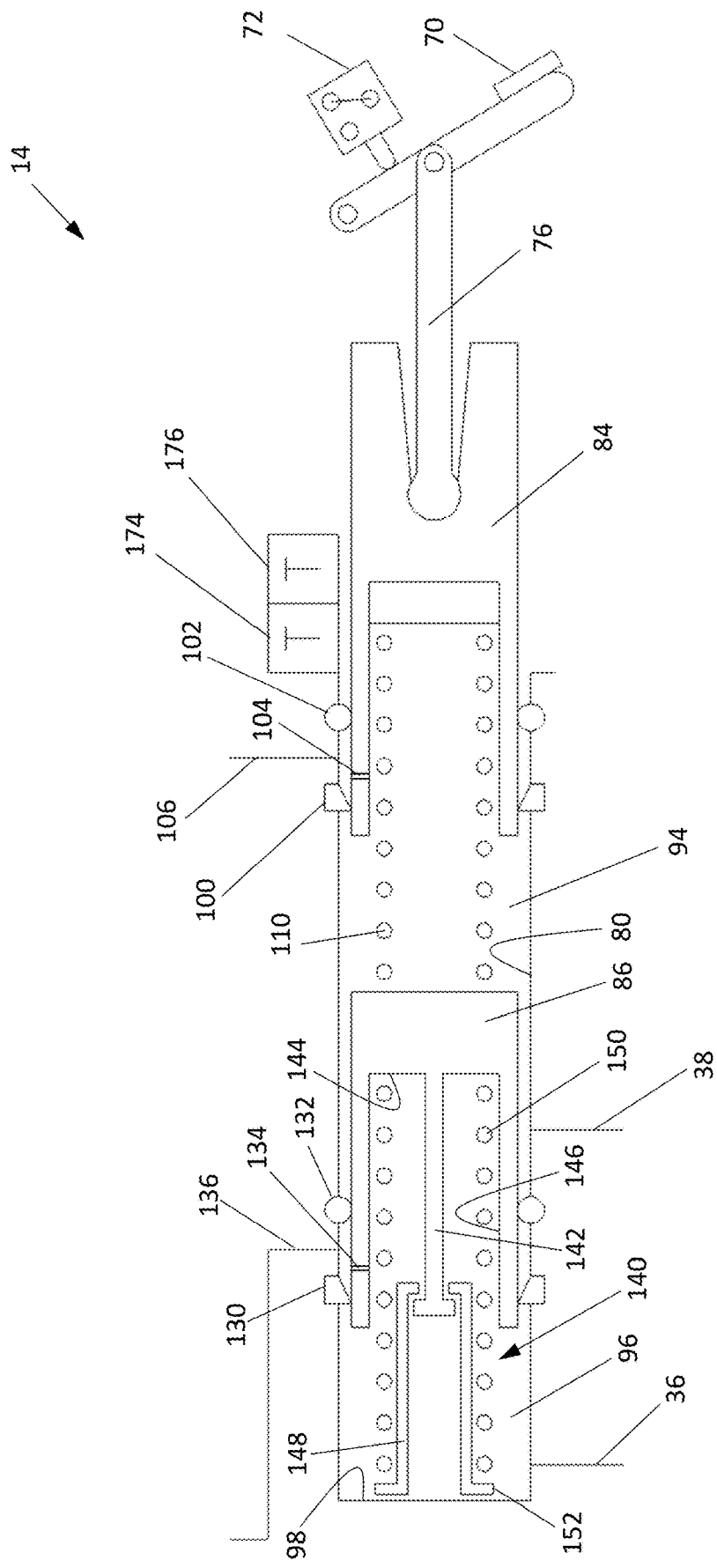
FIG. 2 is an enlarged schematic cross-sectional illustration of the master cylinder of the brake system of FIG. 1.

Referring now to the enlarged view of the master cylinder 14 in FIG. 2, the master cylinder 14 includes a housing having a bore 80 formed therein for slidably receiving various cylindrical pistons and other components therein. Note that the housing is not specifically schematically shown in FIGS. 1 and 2 but instead the walls of the bore 80 are illustrated. The housing may be formed as a single unit or include two or more separately formed portions coupled together. A primary piston 84 and a secondary piston 86 are slidably disposed within the bore 80. The primary piston 84 is connected with the brake pedal 70 via a linkage arm 76. Leftward movement of the primary piston 84 and the secondary piston 86 may cause, under certain conditions, a pressure increase within a primary chamber 94 and a secondary chamber 96, respectively, of the master cylinder 14. Various seals of the master cylinder 14 as well as the structure of the housing and the pistons 84 and 86 define the chambers 94 and 96. For example, the primary chamber 94 is generally defined between the primary piston 84 and the secondary piston 86. The secondary chamber 96 is generally defined between the secondary piston 86 and an end wall 98 of the housing formed by the bore 80.

As shown in FIG. 1, the primary chamber 94 of the master cylinder 14 is in fluid communication with the second isolation valve 32 via the conduit 38. Referring back to FIG. 2, an outer wall of the primary piston 84 is engaged with a lip seal 100 and a seal 102 mounted in grooves formed in the housing. One or more lateral passageways 104 are formed through a wall of the primary piston 84. The passageway 104 is located between the lip seal 100 and the seal 102 when the primary piston 84 is in its rest position, as shown in FIGS. 1 and 2. Note that in the rest position the lip seal 100 is just slightly to the left of the passageway 104, thereby permitting fluid communication between the primary chamber 94 and the reservoir 20 via a conduit 106. As will be discussed below, when the passageway 104 moves past the lip seal 100 such that it is to the left of the lip seal 100, fluid communication is cut off between the primary chamber 94 and the reservoir 20. Therefore, the cooperation between the passageway 104, the lip seal 100, and the conduit 106 function as a compensation port selectively permitting fluid communication between the primary chamber 94 and the reservoir 20.

The master cylinder 14 may include a primary spring 110 disposed between the primary piston 84 and the secondary piston 86. The primary spring 110 may help position the secondary piston 86 at a desired placement from the primary piston 84 when the master cylinder 14 is assembled. This positional relationship helps to define the volume of the primary chamber 94 in its at rest state or generally uncompressed condition. The primary spring 110 biases the primary and secondary pistons 84 and 86 away from each other when the primary spring 110 is compressed. The primary spring 110 may be a single coil spring, as shown, or may be include an assembly of parts such as a caged spring assembly.

As shown in FIG. 1, the secondary chamber 96 of the master cylinder 14 is in fluid communication with the first isolation valve 30 via the conduit 36. Referring back to FIG. 2, an outer wall of the secondary piston 86 is engaged with a lip seal 130 and a seal 132 mounted in grooves formed in the housing. One or more lateral passageways 134 are formed through a wall of the secondary piston 86. The passageway 134 is located between the lip seal 130 and the seal 132 when the secondary piston 86 is in its rest position, as shown in FIGS. 1 and 2. Note that in the rest position the lip seal 130 is just slightly to the left of the passageway 134, thereby permitting fluid communication between the secondary chamber 96 and the reservoir 20 via a conduit 136. As will be discussed below, when the passageway 134 moves past the lip seal 130 such that it is to the left of the lip seal 130, fluid communication is cut off between the secondary chamber 96 and the reservoir 20. Therefore, the cooperation between the passageway 134, the lip seal 130, and the conduit 136 function as a compensation port selectively permitting fluid communication between the primary chamber 94 and the reservoir 20.

The master cylinder 14 may include a secondary spring assembly, indicated generally at 140, disposed between the secondary piston 86 and the end wall 98 of the housing of the master cylinder 14. The secondary spring assembly 140 positions the secondary piston 86 at a desired placement relative to the end wall 98 when the master cylinder 14 is assembled. The secondary spring assembly 140 biases the secondary piston 86 in a rightward direction, as viewing FIG. 2, when the secondary spring assembly 140 is compressed. The secondary spring assembly 140 may have any suitable configuration, such as a caged spring assembly as shown. For example, the secondary spring assembly 140 may include a stem 142 attached to a bottom wall 144 of a bore 146 formed in the secondary piston 86. The stem 142 engages with a tubular retainer 148 which is slidably mounted and captured on the stem 142. A coil spring 150 is disposed around the stem 142 and the retainer 148. One end of the coil spring 150 engages with the bottom wall 144 of the bore 146. The other end of the coil spring 150 engages with an outwardly extending flange 152 of the retainer 148.

The primary chamber 94 of the master cylinder 14 is in selective fluid communication with the pedal simulator 16 via a conduit 160 which is in fluid communication with the conduit 38. As will be discussed below, leftward movement of the primary piston 84 caused by the driver depressing the brake pedal 70 will pressurize the primary chamber 94 causing fluid to flow into the pedal simulator 16 via the conduit 160. The pedal simulator 16 can be any suitable structure which provides a feedback force to the driver's foot via the brake pedal 70 when depressed. The pedal simulator 16 may include movable components which mimic the feedback force from a conventional vacuum assist hydraulic brake system. For example, as fluid is diverted into the pedal simulator 16, a simulation pressure chamber 162 defined within the pedal simulator 16 will expand causing movement of a piston 164 within the pedal simulator 16. The piston 164 is slidably disposed in a bore 166 formed in a housing of the pedal simulator 16. The piston 164 is sealingly engaged with the wall of the bore 166 by a seal 167. Movement of the piston 164 compresses a spring assembly, schematically represented as a spring 168. The compression of the spring 168 provides the feedback force to the driver of the vehicle. The spring 168 of the pedal simulator 16 can include any number and types of spring members as desired. For example, the spring 168 may include a combination of low rate and high rate spring elements to provide a non-linear force feedback. The pedal simulator 16 may also include an elastomeric pad 170 which engages with an end of the piston 164 when the piston 164 approaches its end of travel position, thereby providing a desired feedback force different from that provided solely by the spring 168. The spring 168 of the pedal simulator 16 may be housed within an air-filled chamber 172 vented to atmosphere. Alternatively, the spring 168 may be housed in a non-pressurized fluid chamber which may optionally be in fluid communication with the reservoir 20.

The brake system 10 further includes a solenoid actuated simulator valve 180 positioned within the conduit 160 between the primary chamber 94 of the master cylinder 14 and the pedal simulator 16. The simulator valve 180 selectively prevents the flow of fluid from the primary chamber 94 to the simulation chamber 162 of the pedal simulator 16, such as during a failed condition in which the master cylinder 14 is utilized to provide a source of pressurized fluid to the wheel brakes.

An optional check valve in parallel with an optional restricted orifice may be positioned within the conduit 160 or may be incorporated into the simulator valve 180, as illustrated in FIG. 1. The restricted orifice provides damping during a spike apply in which the driver depresses the brake pedal 70 rapidly and forcefully. This damping provides a force feedback making depression of the brake pedal 70 feel more like a traditional vacuum booster, which may be a desirable characteristic of the brake system 10. The damping may also provide a more accurate relationship between brake pedal travel and vehicle deceleration by generally avoiding too much brake pedal travel for the vehicle deceleration that can be delivered by the brake system 10. The check valve can provide an easy flow path and allows the brake pedal 70 to return quickly.

As discussed above, the primary chamber 94 of the master cylinder 14 is selectively in fluid communication with the reservoir 20 via a conduit 106 and the passageway 104 formed in the primary piston 84. The brake system 10 may include a simulator test valve 186 located within the conduit 106. The simulator test valve 186 may be electronically controlled between an open position, as shown in FIG. 1, and an energized closed position. The simulator test valve 186 is not necessarily needed during a normal boosted brake apply or for a manual push-through mode. The simulator test valve 186 can be energized to a closed position during various testing modes to determine the correct operation of other components of the brake system 10. For example, the simulator test valve 186 may be energized to a closed position to prevent venting to the reservoir 20 via the conduit 106 such that a pressure build up in the master cylinder 14 can be used to monitor fluid flow to determine whether leaks may be occurring through seals of various components of the brake system 10. As will be discussed below, the simulator test valve 186 may also be controlled by a secondary ECU separate from the main ECU 22.

The brake system 10 may further include a pressure sensor 188 in fluid communication with the conduit 38 to detect the pressure within the primary chamber 96 and for transmitting the signal indicative of the pressure to the ECU 22. Alternatively or additionally, the brake system 10 may further include a pressure sensor (not shown) in fluid communication with the conduit 36 for transmitting a signal indicative of the pressure within the conduit 36. Sensing the pressure within the conduit 36 may be helpful during diagnostic tests to determine if the secondary piston 86 is moving properly within the master cylinder 14. Besides the added cost, a single pressure sensor 188 monitoring the pressure of the conduit 38, instead of the pressure within the conduit 36, may be desirable for providing a more accurate representation of the driver's intent. The brake system 10 may further include a pressure sensor 190 in fluid communication with the conduit 34 for transmitting a signal indicative of the pressure within the conduit 34 at the output of the plunger assembly 18 and for transmitting the signal indicative of the pressure to the main ECU 22.

Figure 3:
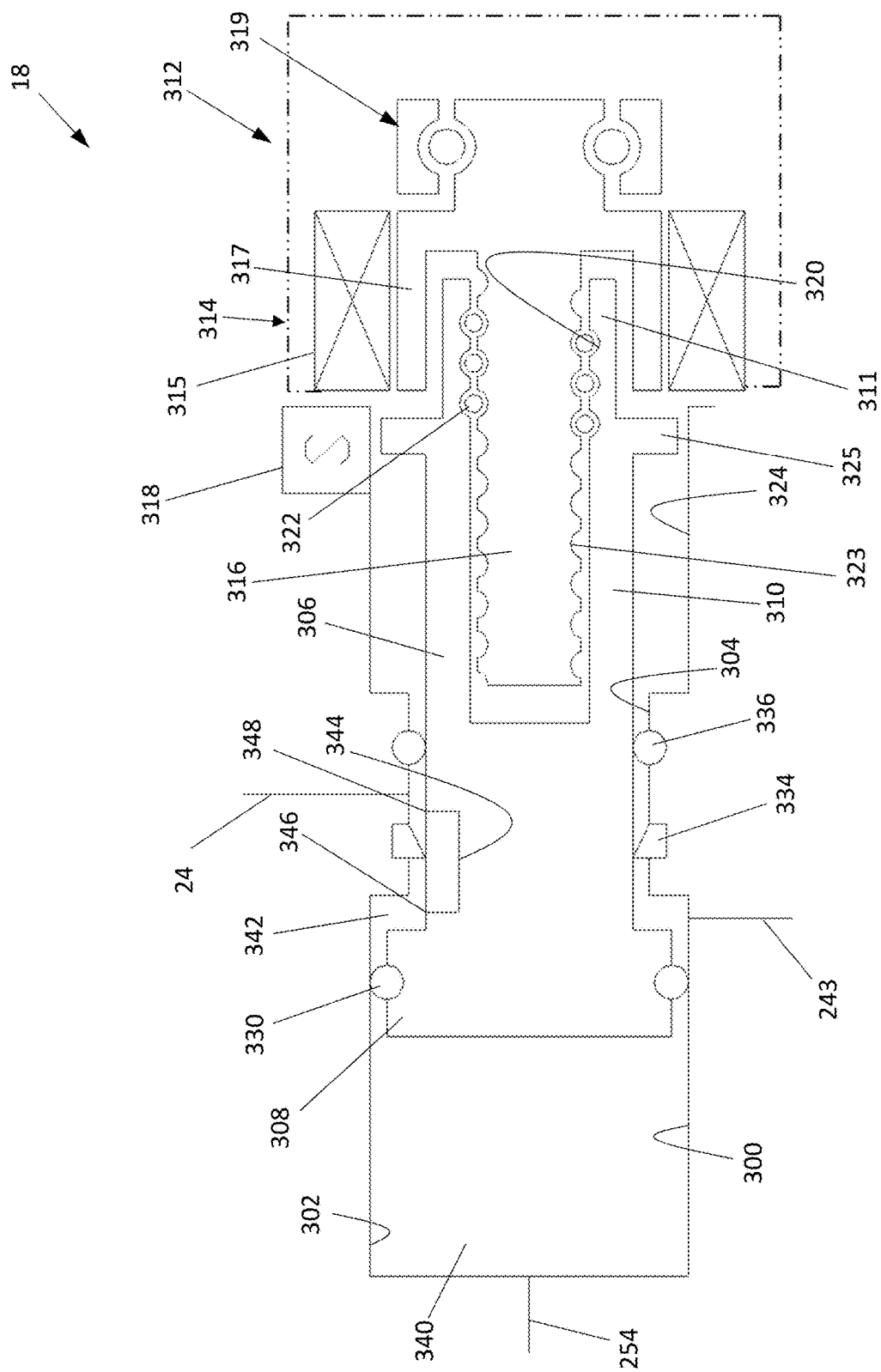
FIG. 3 is an enlarged schematic cross-sectional illustration of the plunger assembly of the brake system of FIG. 1.

Referring now to FIG. 3, the plunger assembly 18 includes a housing having a multi-stepped bore 300 formed therein. Note that the housing is not specifically schematically shown in FIGS. 1 and 3 but instead the walls of the bore 300 are illustrated. The bore 300 includes a first portion 302 and a second portion 304. A piston 306 is slidably disposed within the bore 300. The piston 306 includes an enlarged end portion 308 connected to a smaller diameter central portion 310. The piston 306 has a second end 311 connected to a ball screw mechanism, indicated generally at 312. The ball screw mechanism 312 is provided to impart translational or linear motion of the piston 306 along an axis defined by the bore 300 in both a forward direction (leftward as viewing FIGS. 1 and 3), and a rearward direction (rightward as viewing FIGS. 1 and 3) within the bore 300 of the housing.

In the embodiment shown, the ball screw mechanism 312 includes a motor, indicated schematically and generally at 314, which is electrically connected to the ECU 22 for actuation thereof. The motor 314 rotatably drives a screw shaft 316. The motor 314 generally includes a stator 315 and a rotor 317. In the schematic embodiment shown in FIG. 3, the rotor 317 and the screw shaft 316 are integrally formed together. However, it should be understood that they can be formed from separate parts fixedly connected together. The rotor 317 and the screw shaft 316 are rotatably mounted to the housing of the plunger assembly 18 by a bearing assembly, indicated generally at 319. The second end 311 of the piston 306 includes a threaded bore 320 and functions as a driven nut of the ball screw mechanism 312. The ball screw mechanism 312 includes a plurality of balls 322 that are retained within helical raceways 323 formed in the screw shaft 316 and the threaded bore 320 of the piston 306 to reduce friction. Although a ball screw mechanism 312 is shown and described with respect to the plunger assembly 18, it should be understood that other suitable mechanical linear actuators may be used for imparting movement of the piston 306. It should also be understood that although the piston 306 functions as the nut of the ball screw mechanism 312, the piston 306 could be configured to function as a screw shaft of the ball screw mechanism 312.

The piston 306 may include structures engaged with cooperating structures formed in the housing of the plunger assembly 18 to prevent rotation of the piston 306 as the screw shaft 316 rotates relative to the piston 306. For example, the piston 306 may include outwardly extending splines or tabs or splines 325 disposed within longitudinal grooves 324 formed in the housing. The splines 325 slide along within the grooves 324 as the piston 306 travels in the bore 300.

As will be discussed below, the plunger assembly 18 is preferably configured to provide pressure to the conduit 34 when the piston 306 is moved in both the forward and rearward directions. The plunger assembly 18 includes a seal 330 mounted on the enlarged end portion 308 of the piston 306. The seal 330 slidably engages with the inner cylindrical surface of the first portion 302 of the bore 300 as the piston 306 moves within the bore 300. A seal 334 and a seal 336 are mounted in grooves formed in the second portion 304 of the bore 300. The seals 334 and 336 slidably engage with the outer cylindrical surface of the central portion 310 of the piston 306. A first pressure chamber 340 is generally defined by the first portion 302 of the bore 300, the enlarged end portion 308 of the piston 306, and the seal 330. The first pressure chamber 340 is in fluid communication with a conduit 254 which is selectively in fluid communication with the output conduit 34, as will be explained below. An annular shaped second pressure chamber 342, located generally behind the enlarged end portion 308 of the piston 306, is generally defined by the first and second portions 302 and 304 of the bore 300, the seals 330 and 334, and the central portion 310 of the piston 306. The seals 330, 334, and 336 can have any suitable seal structure. The second pressure chamber 342 is in fluid communication with a conduit 243 which is in fluid communication with the output conduit 34.

Although the plunger assembly 18 may be configured to any suitable size and arrangement, in one embodiment, the effective hydraulic area of the first pressure chamber 340 is greater than the effective hydraulic area of the annular shaped second pressure chamber 342. The first pressure chamber 340 generally has an effective hydraulic area corresponding to the diameter of the central portion 310 of the piston 306 (the inner diameter of the seal 334) since fluid is diverted through the conduits 254, 34, and 243 as the piston 306 is advanced in the forward direction. The second pressure chamber 342 generally has an effective hydraulic area corresponding to the diameter of the first portion 302 of the bore 300 minus the diameter of the central portion 310 of the piston 306 if the plunger valves 250 and 252 are closed. If desired, the plunger assembly 18 could be configured to provide that on the back stroke in which the piston 306 is moving rearwardly, less torque (or power) is required by the motor 314 to maintain the same pressure as in its forward stroke. Of course, it may also be desirable to configure the plunger assembly 18 such that the behavior of the rearward stroke is the same or similar to the forward stroke of the plunger assembly 18.

The plunger assembly 18 preferably includes a sensor, schematically shown as 318, for indirectly detecting the position of the piston 306 within the bore 300. The sensor 318 is in communication with the ECU 22. In one embodiment, the sensor 318 detects the rotational position of the rotor 317 which may have metallic or magnetic elements embedded therein. Since the rotor 317 is schematically shown as being integrally formed with the shaft 316, the rotational position of the shaft 316 corresponds to the linear position of the piston 306. Thus, the position of the piston 306 can be determined by sensing the rotational position of the rotor 317 via the sensor 318. Note that due to ease of manufacturing, the rotor 317 may not be integrally formed with the shaft 316 but rather may be a separate part connected to the shaft 316.

As best shown in FIG. 3, the piston 306 of the plunger assembly 18 includes a passageway 344 formed therein. The passageway 344 defines a first port 346 extending through the outer cylindrical wall of the piston 306 and is in fluid communication with the secondary chamber 342. The passageway 344 also defines a second port 348 extending through the outer cylindrical wall of the piston 306 and is in fluid communication with a portion of the bore 300 located between the seals 334 and 336. The second port 348 is in fluid communication with a conduit 24 which is in fluid communication with the reservoir 20. When in the rest position, as shown in FIG. 3, the pressure chambers 340 and 342 are in fluid communication with the reservoir 20 via the conduit 24. This helps in ensuring a proper release of pressure at the output of the plunger assembly 18 and within the pressure chambers 340 and 342 themselves. After an initial forward movement of the piston 306 from its rest position, the port 348 will move past the lip seal 334, thereby closing off fluid communication of the pressure chambers 340 and 342 from the reservoir 20, thereby permitting the pressure chambers 340 and 342 to build up pressure as the piston 306 moves further.

Referring back to FIG. 1, the brake system 10 further includes a first plunger valve 250, and a second plunger valve 252. The first plunger valve 250 is preferably a solenoid actuated normally closed valve. Thus, in the non-energized state, the first plunger valve 250 is in a closed position, as shown in FIG. 1. The second plunger valve 252 is preferably a solenoid actuated normally open valve. Thus, in the non-energized state, the second plunger valve 252 is in an open position, as shown in FIG. 1. A check valve may be arranged within the second plunger valve 252 so that when the second plunger valve 252 is in its closed position, fluid may still flow through the second plunger valve 252 in the direction from a first output conduit 254 (from the first pressure chamber 240 of the plunger assembly 18) to the conduit 34 leading to the isolation valves 30 and 32. Note that during a rearward stroke of the piston 206 of the plunger assembly 18, pressure may be generated in the second pressure chamber 242 for output into the conduit 34.

Generally, the first and second plunger valves 250 and 252 are controlled to permit fluid flow at the outputs of the plunger assembly 18 and to permit venting to the reservoir 20 through the plunger assembly 18 when so desired. For example, the first plunger valve 250 may be energized to its open position during a normal braking event so that both of the first and second plunger valves 250 and 252 are open. Preferably, the first plunger valve 250 is almost always energized during an ignition cycle when the engine is running (which may reduce noise during operation). Of course, the first plunger valve 250 may be purposely moved to its closed position such as during a pressure generating rearward stroke of the plunger assembly 18. The first and second plunger valves 250 and 252 are preferably in their open positions when the piston 206 of the plunger assembly 18 is operated in its forward stroke to maximize flow. When the driver releases the brake pedal 70, the first and second plunger valves 250 and 252 preferably remain in their open positions. Note that fluid can flow through the check valve within the closed second plunger valve 252, as well as through a check valve 258 from the reservoir 20 depending on the travel direction of the piston 206 of the plunger assembly 18.

It may be desirable to configure the first plunger valve 250 with a relatively large orifice therethrough when in its open position. A relatively large orifice of the first plunger assembly 250 helps to provide an easy flow path therethrough. The second plunger valve 252 may be provided with a much smaller orifice in its open position as compared to the first plunger valve 250. One reason for this is to help prevent the piston 206 of the plunger assembly 18 from rapidly being back driven upon a failed event due to the rushing of fluid through the first output conduit 254 into the first pressure chamber 240 of the plunger assembly 18, thereby preventing damage to the plunger assembly 18. As fluid is restricted in its flow through the relatively small orifice, dissipation will occur as some of the energy is transferred into heat. Thus, the orifice should be of a sufficiently small size so as to help prevent a sudden catastrophic back drive of the piston 206 of the plunger assembly 18 upon failure of the brake system 10, such as for example, when power is lost to the motor 214 and the pressure within the conduit 34 is relatively high. The plunger assembly 18 may include an optional spring member (not shown) to assist in cushioning such a rapid rearward back drive of the piston 206.

The first and second plunger valves 250 and 252 provide for an open parallel path between the pressure chambers 340 and 342 of the plunger assembly 18 during a normal braking operation. Although a single open path may be sufficient, the advantage of having both the first and second plunger valves 250 and 252 is that the first plunger valve 250 may provide for an easy flow path through the relatively large orifice thereof, while the second plunger valve 252 may provide for a restricted orifice path during certain failed conditions (when the first plunger valve 250 is de-energized to its closed position.

Figure 4:
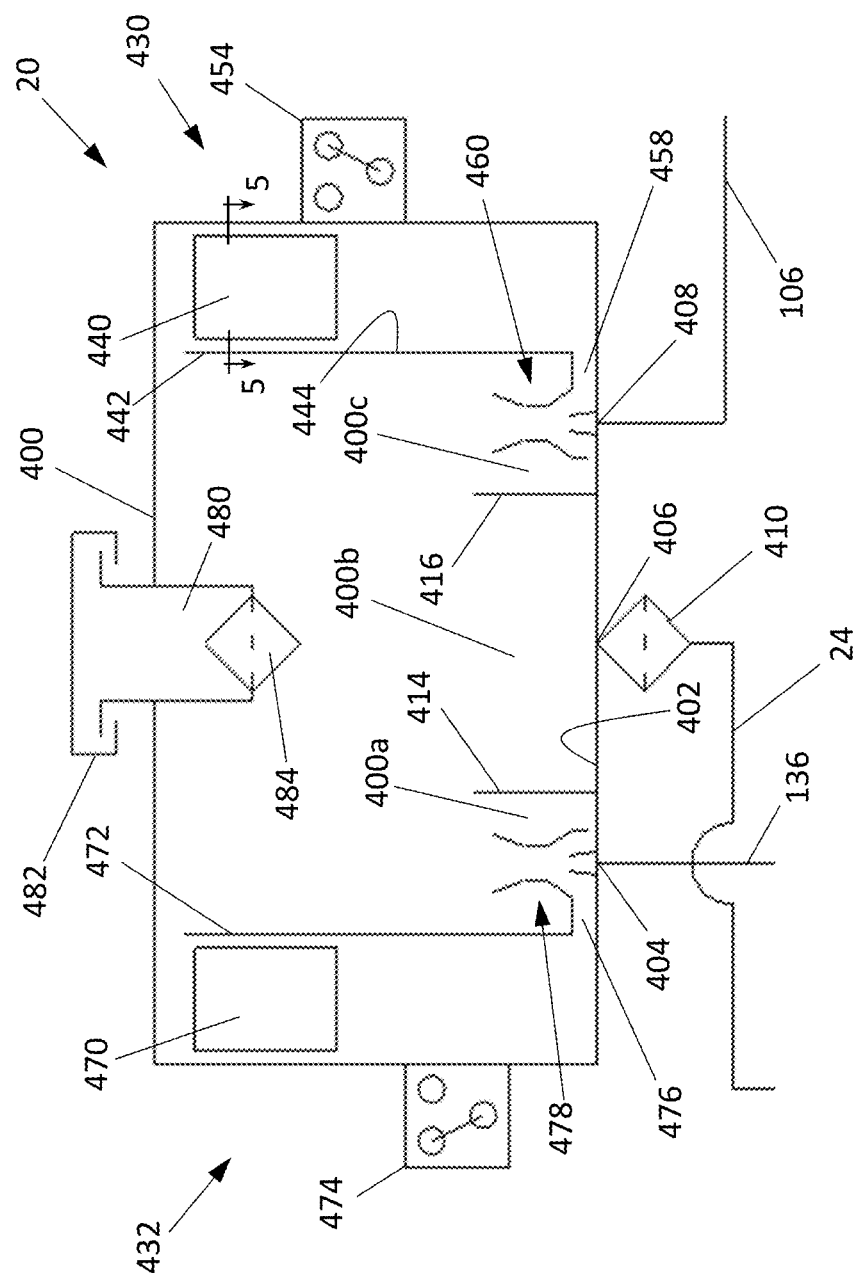
FIG. 4 is an enlarged schematic cross-sectional illustration of the fluid reservoir of the brake system of FIG. 1.

Referring now to FIG. 4, the reservoir 20 includes a main body or tank, indicated schematically at 400. The tank 400 has a hollow interior and may be made of plastic or any other suitable material for holding brake fluid for the brake system 10. The brake fluid within the tank 400 is preferably held at about atmospheric pressure. Of course, the fluid within the reservoir 20 may be held at any suitable pressure if so desired. The tank 400 can have any suitable hollow shape for holding the brake fluid. The tank 400 has a bottom floor 402 which includes passageways or ports 404, 406, and 408. The port 404 is in fluid communication with the conduit 136 leading to the secondary chamber 96 of the master cylinder 14. The port 406 is in fluid communication with the conduit 24 leading to the plunger assembly 18. Note that an optional contaminant filter 410 is positioned within the conduit 24 adjacent the port 406. Of course, any suitable contaminant filter(s) may be positioned within any conduit or port of the brake system 10. The port 408 is in fluid communication with the conduit 106 leading to the primary chamber 94 of the master cylinder 14.

Referring again to FIG. 4, the tank 400 may include separator walls 414 and 416 partially extending upwardly from the bottom floor 402 of the tank 400. The walls 414 and 416 extend all the way from one side wall of the tank 400 to the other opposed side wall of the tank 400 to generally define three separate fluid chambers 400a, 400b, and 400c at the lower portion of the tank 400. If the fluid level within the tank 400 ever falls below the upper portions of the separator walls 414 and 416, respectively, the lower sides of the tank 400 and the separator walls 414 and 416 will define the three separate chambers 400a, 400b, and 400c such that the fluid from each of the chambers is isolated from one another. This provides for the prevention of completing draining the entire tank 400 of fluid in the event that a single leak occurs within the brake system 10 corresponding to downstream of just one of the ports 404, 406, and 408. For example, if a leak occurs in the conduit 136, fluid within the initially full tank 400 would leak out of the conduit 136 via the port 404 until the fluid level reaches the upper portions of the separator walls 414 and 416. At this point, the fluid within each of the three chambers 400a, 400b, and 400c is isolated from one another. Fluid would continue to be leaked from the chamber 400a from the leaking conduit 136. However, the fluid level within the other two chambers 400b and 400c would remain at their level, wherein the fluid level is at the top of the separator walls 414 and 416.

The reservoir 20 preferably includes at least one fluid level detector, such as the fluid level detector assembly, indicated generally at 430. In the embodiment of the reservoir 20 illustrated in FIGS. 1 and 4, the reservoir 20 includes a second fluid level detector assembly, indicated generally at 432. It should be understood that the reservoir 20 may have just a single fluid level assembly 430, or any other additional and types of fluid level detectors. As will be explained in detail below, the fluid level detector assemblies 430 and 432 detect when the fluid level within the tank 400 is below acceptable levels and sends a signal to the ECU 22 of such information. The ECU 22 can then signal an alert to the operator of the vehicle by displaying a visual alert and/or an audible warning that the fluid level within the tank 400 of the reservoir 20 is lower than acceptable and requires attention.

The first fluid level detector assembly 430 includes a float 440 which is slidably housed and guided within a guide tube 442 defining a hollow interior 444. The float 440 can be any suitable structure that is buoyant in the fluid within the tank 400 and moves with respect to the level or height of the fluid within the tank 400. The buoyant float 440 may be designed such that it floats almost entirely on top of the fluid, partially submerged in the fluid, or entirely submerged within the fluid. The float 440 may be mounted within the guide tube 442 such that it is fully submerged and forced to maintain a desired position within the fluid in the interior of the tank 400. The guide tube 442 may be made of any suitable material and may be manufactured integral with the tank 400. In the schematic embodiment illustrated in FIGS. 4 and 5, the guide tube 442 has a rectangular cross-sectional shape and is formed by a side wall 446 of the tank 400 and three walls 448, 450 and 452. The float 440 has a generally similar cross-sectional shape as the guide tube 442 but is dimensioned slightly smaller such that the float 440 can easily move within the guide tube 442 unhindered while the guide tube 442 provides guided stability when the float 440 moves within. Optional ribs 453 oriented vertically and protruding from the walls 446, 448, 450 and 452 may be used to help stabilize and position the float 440 within the guide tube 442. The vertical ribs 453 limit the lateral travel of the float 440 within the guide tube 442 while maintaining a desired volume of fluid within a clearance gap G" between the outer surface of the float 440 and the inner walls of the guide tube 442. The reason for which will be explained below.

The fluid level detector assembly 430 further includes a switch mechanism or sensor assembly, indicated schematically at 454. The sensor assembly 454 can be any suitable mechanism that detects the movement and/or position of the float 440 relative to the tank 400. Determining the position of the float 440 corresponds to the fluid level within the tank 400. For example, the sensor assembly 454 may be in the form of a magnetic sensor such that a hall element is placed within the sensor assembly 454 and magnetic elements are attached or embedded into the float 440. The sensor assembly 454 is mounted at a desired position along the wall of the tank 400 such that detection of the float 440 can be sensed when the float 440 is adjacent to the sensor assembly 454, thereby triggering the sensor assembly 454 to transmit a signal to the ECU 22 of the brake system 10 that the tank 400 is under a low fluid level condition. The sensor assembly 454 may be positioned within or outside of the tank 400. Alternatively, the sensor assembly 454 may be in the form of a reed switch.

The upper portion of the guide tube 442 is preferably open and exposed to the interior of the tank 400. The lower portion of the guide tube 442 may also be open and exposed to the interior of the tank 400. In a preferred embodiment of the reservoir 20 as shown in FIG. 4, the lower portion of the guide tube 442 includes a passageway 458 that is in fluid communication with an eductor, indicated generally at 460. The eductor 460 (sometimes referred to as an eductor jet pump) is positioned adjacent the port 408. The eductor 460 permits the flow of fluid between the interior of the tank 400 and the port 408 in both directions. During normal operation of the brake system 10 in which fluid passes between the reservoir 20 and the conduit 106 via the port 408, the eductor 460 has little effect on the fluid flow since the fluid flow is at relatively low velocity. The eductor 460 may be used during a diagnostic routine in which relatively high velocity fluid is directed through the eductor 460 to help in determining proper operation of the fluid level detector assembly 430. The structure and operation of the eductor 460 will be described in more detail below.

The second fluid level detector assembly 432 mounted on the left side of the reservoir 20, as viewing FIGS. 1 and 4, may be similar in structure and function as the first fluid level detector assembly 430. As such, a detailed description of the second fluid level detector assembly 432 will not be duplicated herein. The second fluid level detector assembly 432 includes a float 470 slidably disposed in a guide tube 472. A sensor assembly 474 detects the movement and/or position of the float 470 relative to the tank 400 which corresponds to the level of the fluid within the tank 400. The lower portion of the guide tube 472 is in fluid communication with a passageway 476 which is in fluid communication with an eductor 478.

The second fluid level detector assembly 432 may be provided for redundancy purposes in case of failure of the first fluid level detector assembly 430. Additionally, the second fluid level detector assembly 432 may be utilized as a second critical warning system in case the operator of the vehicle ignores the warnings from the first fluid level detector assembly 430. As schematically shown in FIG. 4, the second sensor assembly 474 is positioned lower along the side wall of the tank 400 compared to the first sensor assembly 454. Thus, the first fluid level detector 430 may be used to provide a warning that the fluid level within the tank 400 is low but that the brake system 10 is still fully operational. The second fluid level detector assembly 432 may be used to provide a critical warning that the fluid level in the tank 400 is so low that various features of the brake system 10 may not function properly. The ECU 22 may also control the brake system 10 in a different manner due to the critically low fluid level on hand for the brake system 10.

Referring again to FIG. 4, the reservoir 20 may further include a fill tube 480 mounted on the upper portion of the tank 400 to provide access to the interior of the tank 400 to fill the reservoir with brake fluid. A removable cap 482 can be used to cover the fill tube 480. An optional filter 484 may be used between the fill tube 480 and the interior of the tank 400 to help prevent contaminates from entering the interior of the tank 400. The cap 482 and the fill tube 480 may be designed to provide atmospheric pressurizing of the interior of the tank 400.

The operation of the brake system 10 will now be described. During a typical or normal braking operation, the brake pedal 70 is depressed by the driver of the vehicle. In a preferred embodiment of the brake system 10, the master cylinder 14 includes one or more travel sensors 174 and 176 (for redundancy) for producing signals transmitted to the ECU 22 that are indicative of the length of travel of the input piston 82 of the master cylinder 14.

During normal braking operations, the plunger assembly 18 is operated to provide pressure to the conduit 34 for actuation of the wheel brakes 12a, 12b, 12c, and 12d. Under certain driving conditions, the ECU 22 communicates with a powertrain control module (not shown) and other additional braking controllers of the vehicle to provide coordinated braking during advanced braking control schemes (e.g., anti-lock braking (AB), traction control (TC), vehicle stability control (VSC), and regenerative brake blending). During a normal brake apply, the flow of pressurized fluid from the master cylinder 14, generated by depression of the brake pedal 70, is diverted into the pedal simulator 16. The simulator valve 180 is actuated to divert fluid through the simulator valve 180 from the primary chamber 94. Note that fluid flow from the primary chamber 94 to the reservoir 20 is closed off once the passageway 104 in the primary piston 84 moves past the seal 100.

During the duration of a normal braking event, the simulator valve 180 remains open, preferably. Also during the normal braking operation, the isolation valves 30 and 32 are energized to secondary positions to prevent the flow of fluid from the conduits 36 and 38 through the isolation valves 30 and 32, respectively. Preferably, the isolation valves 30 and 32 are energized throughout the duration of an ignition cycle such as when the engine is running instead of being energized on and off to help minimize noise. Note that the primary and secondary chambers 94 and 96 are not in fluid communication with the reservoir 20 due to the passageways 104 and 134 of the pistons 84 and 86, respectively, being positioned past the lip seals 132 and 130, respectively. Prevention of fluid flow through the isolation valves 30 and 32 hydraulically locks the primary and secondary chambers 94 and 96 of the master cylinder 14 preventing further movement of the primary and secondary pistons 84 and 86.

It is generally desirable to maintain the isolation valves 30 and 32 energized during the normal braking mode to ensure venting of fluid to the reservoir 20 through the plunger assembly 18 such as during a release of the brake pedal 70 by the driver. As best shown in FIG. 3, the passageway 344 formed in the piston 306 of the plunger assembly 18 permits this ventilation.

During normal braking operations, while the pedal simulator 16 is being actuated by depression of the brake pedal 70, the plunger assembly 18 can be actuated by the ECU 22 to provide actuation of the wheel brakes 12a, 12b, 12c, and 12d. The plunger assembly 18 is operated to provide desired pressure levels to the wheel brakes 12a, 12b, 12c, and 12d compared to the pressure generated by the master cylinder 14 by the driver depressing the brake pedal 70. The electronic control unit 22 actuates the motor 314 to rotate the rotor 317 and the screw shaft 316 in the first rotational direction. Rotation of the screw shaft 316 in the first rotational direction causes the piston 306 to advance in the forward direction (leftward as viewing FIGS. 1 and 3). Movement of the piston 306 causes a pressure increase in the first pressure chamber 340 and fluid to flow out of the first pressure chamber 340 and into the conduit 254. Fluid can flow into the conduit 34 via the open first and second plunger valves 250 and 252. Note that fluid is permitted to flow into the second pressure chamber 342 via a conduit 243 as the piston 306 advances in the forward direction. Pressurized fluid from the conduit 34 is directed into the conduits 40 and 42 through the isolation valves 30 and 32. The pressurized fluid from the conduits 40 and 42 can be directed to the wheel brakes 12*a*, 12*b*, 12*c*, and 12*d* through open apply valves 50, 54, 58, and 62 while the dump valves 52, 56, 60, and 64 remain closed. When the driver lifts off or releases the brake pedal 70, the ECU 22 can operate the motor 314 to rotate the screw shaft 316 in the second rotational direction causing the piston 306 to retract withdrawing the fluid from the wheel brakes 12*a*, 12*b*, 12*c*, and 12*d*. The speed and distance of the retraction of the piston 306 is based on the demands of the driver releasing the brake pedal 70 as sensed by the sensor 318. Of course, if the driver rapidly releases the brake pedal 70, the plunger assembly 18 may be operated to avoid such an instant drop in pressure. Under certain conditions, such as in a non-boosted slip control event, the pressurized fluid from the wheel brakes 12*a*, 12*b*, 12*c*, and 12*d* may assist in back-driving the ball screw mechanism 312 moving the piston 306 back towards its rest position. Note that when the driver releases the brake pedal 70, the first and second plunger valves 250 and 252 preferably remain in their open positions during a non-slip control event.

In some situations, the piston 306 of the plunger assembly 18 may reach its full stroke length within the bore 300 of the housing and additional boosted pressure is still desired to be delivered to the wheel brakes 12*a*, 12*b*, 12*c*, and 12*d*. The plunger assembly 18 is a dual acting plunger assembly such that it is configured to also provide boosted pressure to the conduit 34 when the piston 306 is stroked rearwardly (rightward) or in a reverse direction. This has the advantage over a conventional plunger assembly that first requires its piston to be brought backward before it can again advance the piston to create pressure within a single pressure chamber. If the piston 306 has reached its full stroke, for example, and additional boosted pressure is still desired, the second plunger valve 252 is energized to its closed check valve position. The first plunger valve 250 is de-energized to its closed position. The electronic control unit 22 actuates the motor 314 in a second rotational direction opposite the first rotational direction to rotate the screw shaft 316 in the second rotational direction. Rotation of the screw shaft 316 in the second rotational direction causes the piston 306 to retract or move in the rearward direction (rightward as viewing FIGS. 1 and 3). Movement of the piston 306 causes a pressure increase in the second pressure chamber 342 and fluid to flow out of the second pressure chamber 342 and into the conduit 243 and the conduit 34. Pressurized fluid from the conduit 34 is directed into the conduits 40 and 42 through the isolation valves 30 and 32. The pressurized fluid from the conduits 40 and 42 can be directed to the wheel brakes 12*a*, 12*b*, 12*c*, and 12*d* through the opened apply valves 50, 54, 58, and 62 while dump valves 52, 56, 60, and 64 remain closed. In a similar manner as during a forward stroke of the piston 306, the ECU 22 can also selectively actuate the apply valves 50, 54, 58, and 62 and the dump valves 52, 56, 60, and 64 to provide a desired pressure level to the wheel brakes 12*a*, 12*b*, 12*c*, and 12*d*, respectively.

When the driver lifts off or releases the brake pedal 70 during a pressurized rearward stroke of the plunger assembly 18, the first and second plunger valves 250 and 252 are preferably operated to their open positions, although having only one of the valves 250 and 252 open would generally still be sufficient. Note that when transitioning out of a slip control event, the ideal situation would be to have the position of the piston 306 and the displaced volume within the plunger assembly 18 correlate exactly with the given pressures and fluid volumes within the wheel brakes 12*a*, 12*b*, 12*c*, and 12*d*. However, it is noted that fluid may be drawn from the reservoir 20 via the check valve 258 into the chamber 340 of the plunger assembly 18.

During a braking event, the ECU 22 can selectively actuate the apply valves 50, 54, 58, and 62 and the dump valves 52, 56, 60, and 64 to provide a desired pressure level to the wheel brakes, respectively. The ECU 22 can also control the brake system 10 during ABS, DRP, TC, VSC, regenerative braking, and autonomous braking events by general operation of the plunger assembly 18 in conjunction with the apply valves and the dump valves. Even if the driver of the vehicle is not depressing the brake pedal 70, the ECU 22 can operate the plunger assembly 18 to provide a source of pressurized fluid directed to the wheel brakes, such as during an autonomous vehicle braking event.

In the event of a loss of electrical power to portions of the brake system 10, the brake system 10 provides for manual push through or manual apply such that the master cylinder 14 can supply relatively high pressure fluid to the conduits 36 and 38. During an electrical failure, the motor 314 of the plunger assembly 18 might cease to operate, thereby failing to produce pressurized hydraulic brake fluid from the plunger assembly 18. The isolation valves 30 and 32 will shuttle (or remain) in their positions to permit fluid flow from the conduits 36 and 38 to the wheel brakes 12*a*, 12*b*, 12*c*, and 12*d*. The simulator valve 180 is shuttled (or remains) to its closed position to prevent fluid from flowing out of the primary chamber 94 to the pedal simulator 16. During the manual push-through apply, the primary piston 84 and the secondary piston 86 will advance leftwardly such that the passageways 104 and 134 will move past the seals 100 and 130, respectively, to prevent fluid flow from their respective fluid chambers 94 and 96 to the reservoir 20, thereby pressurizing the chambers 94 and 96. Fluid flows from the chambers 94 and 96 into the conduits 38 and 36, respectively, to actuate the wheel brakes 12*a*, 12*b*, 12*c*, and 12*d*.

Due to a possible requirement of engaging the brake system 10 into a desired failure mode requiring a relatively large amount of replenishing fluid from the reservoir 20, it is generally important to make sure the fluid level detector assemblies 430 and 432 are operating properly. Proper operation of the fluid level detector assemblies 430 and 430 assures that the brake system 10 is reading the actual fluid level within the fluid reservoir 20. If not operating properly, the ECU 22 may alert the operator of the vehicle by displaying a visual alert and/or an audible warning that the fluid level detector assemblies 430 and 432 need attention. The fluid level detector assemblies 430 and 432 may fail, for example, if the floats 440 and 470 are hindered from proper movement within the respective guide tubes 442 and 472. This may be caused by crust formation or a buildup of deposits along the walls of the guide tubes 442 and 472 which interfere with the smooth sliding motion of the floats 440 and 470 within the guide tubes 442 and 472. Other types of failures may include malfunctioning of the sensor assemblies 454 and 474. Therefore, it is desirable that the brake system 10 provides a diagnostic system for monitoring the proper operation of the fluid level detector assemblies 430 and 432.

An example of a suitable diagnostic system for the fluid level detector assemblies 430 and 432 is to intentionally cause movement of the floats 440 and 470 even when there is a full level of fluid within the tank 400. The sensor assemblies 454 and 474 are then monitored to make sure they detect movement of the floats 440 and 470 as the floats 440 and 470 pass by the sensor assemblies 430 and 432. This float detection mimics a low fluid reading and helps determine that the fluid level detector assemblies 430 and 432 are operating properly. In the embodiment of the reservoir 20 illustrated in FIG. 4, the eductors 460 and 478 may be utilized to cause movement of the floats 440 and 470 for a diagnostic test. The diagnostic procedure of the first and second fluid level detector assemblies 430 and 432 are similar and, therefore, only the diagnostic procedure of the first fluid level detector assembly 430 will be described in detail herein.

As best shown in FIG. 4, to perform the diagnostic test to determine the proper operation of the fluid level detector assembly 430, the float 440 needs to be moved downwardly in the guide tube 442 to a position generally adjacent the sensor assembly 454 sufficiently so that the sensor assembly 454 is triggered, such as by a magnetic sensor as described above. A preferred method is to move the float hydraulically or by fluid hydraulic means. One method of moving the float 440 downwardly is to create a temporary low fluid pressure region directly below the float 440 such that the higher pressure region above the float 440 pushes the float 440 downwardly further into the fluid within the tank 400. The float 440 will move downwardly until the pressure underneath and above the float 440 equalizes, wherein the float 440 will return to its normal position. Note that this low fluid pressure region need only last a sufficiently small period of time to draw the float 440 downwardly adjacent the sensor assembly 454 to trigger the sensor assembly 454. Thus, the low pressure region does not need to be sustained for a long duration. The eductor 460 is utilized to create the low pressure region within the bottom portion of the guide tube 442.

Figure 6:
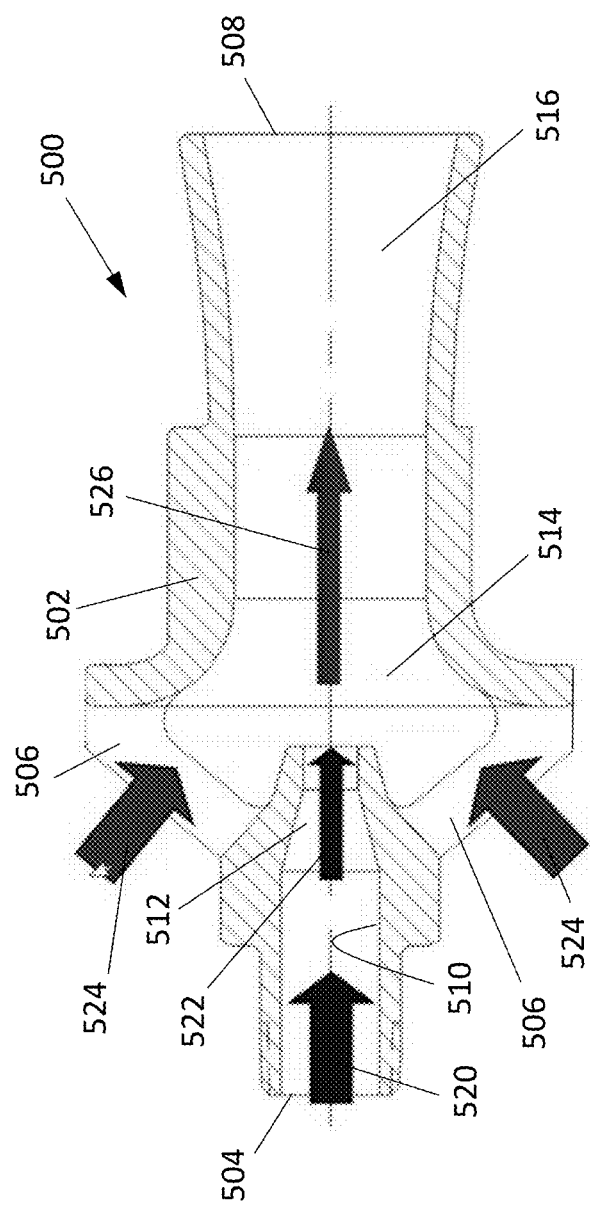
FIG. 6 is a schematic cross-sectional illustration of an eductor which may be used in the fluid reservoir illustrated in FIG. 4.

FIG. 6 is a schematic drawing of an eductor, indicated generally at 500, to help describe the principle of an eductor jet style pump. The eductor 500 can be modified to function as the eductors 460 and 478 schematically shown in FIG. 4. The eductor 500 includes a single body 502 which has no moving parts and may be made of a single material. This type of eductor is advantageous for use in the reservoir 20 since the eductors 460 and 478 can simply be integrally formed in the bottom floor 402 of the tank 400 as the tank 400 is formed. For example, the tank 400 may be made of plastic integrally forming the tank floors, walls, and eductors 460 and 478. Of course, the eductors 460 and 478 may be made separately and installed adjacent the ports 408 and 404, respectively.

The eductor 500 includes a motive fluid inlet 504, one or more secondary fluid inlets 506, and a fluid outlet 508 formed in the body 502. The motive fluid inlet 504 is in fluid communication with an inlet passageway 510 formed in the body 502. The inlet passageway 510 preferably includes a necked-down converging nozzle 512 which communicates with a converging inlet 514 within the body 502. The secondary fluid inlets are also connected to the converging inlet 514. The converging inlet 514 is in fluid communication with a diverging outlet passageway 516.

In operation, a source of pressurized fluid enters the motive fluid inlet 504, as represented by an arrow 520 in FIG. 6. The fluid continues to flow through the inlet passageway 510 and then through the converging nozzle 512, as represented by an arrow 522, where the fluid velocity increases while the fluid pressure decreases due to a venturi effect. A second source of fluid is drawn in from the secondary fluid inlets 506, as represented by arrows 524, and combines with the fluid from the converging nozzle 512, as represented by the arrow 526. The combined fluid then exists the fluid outlet 508.

Figure 5:
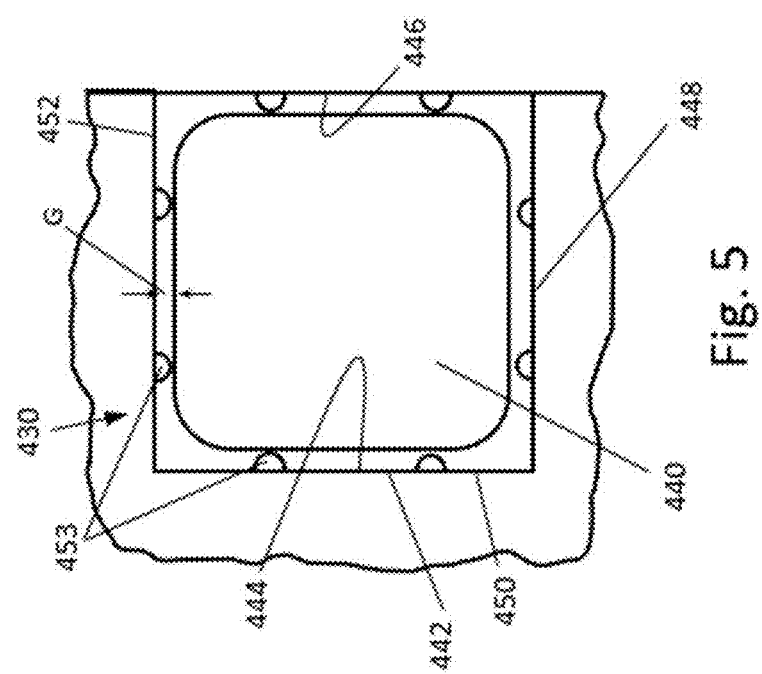
FIG. 5 is a schematic partial cross-sectional view taken along lines 5-5 in FIG. 4.

Modification of the design of the eductor 500 and incorporating these features into the eductors 460 and 478 provides a means for creating a low pressure region to draw the floats 440 and 470 downwardly caused by the higher fluid pressure biasing or pushing the floats 440 and 470 downwardly within their respective guide tubes 442 and 472. For example, with respect to the first fluid level detector assembly 430, the motive fluid inlet 504 of the eductor 500 could be incorporated into the eductor 460 such that the motive fluid inlet is connected with the port 408 which is in fluid communication with conduit 106. Additionally, the secondary fluid inlets 506 of the eductor 500 could be incorporated into the eductor 460 such that the secondary fluid inlets are connected to the passageway 458 which is in fluid communication with the bottom portion of the guide tube 442. If the brake system 10 was controlled to send a stream of fluid from the conduit 106 into the reservoir 20 through the port 408, fluid would be sucked into the eductor 460 from the passageway 458, thereby creating a low pressure region at the bottom portion of the guide tube 442. This low pressure region would enable the higher fluid pressure above the float 440 to push the float 440 downwardly. The brake system 10 can be controlled to generate enough low fluid pressure within this region such that the fluid would not be able to recirculate around the float 440 fast enough. As shown in FIG. 5, the float 440 and the interior cross-section of the guide tube 442 are designed to provide a clearance or gap "G" between the outer surface of the float 440 and the inner walls of the guide tube 442. The gap G should be designed sufficiently large enough to permit the float 440 to freely move within the guide tube 442 yet small enough to prevent fluid from above the float 440 to easily flow though this gap G preventing the float 440 from moving. In other words, the gap G should not be too large to permit the fluid from above the float 440 to simply bypass therethrough preventing an adequate movement of the float 440 downwardly. The optional vertical ribs 453 help to position the float 440 within the guide tube 442 to reduce lateral movement therein while still maintaining an adequate amount of fluid volume surrounding the float 440 for proper operation of the float 440 within the guide tube 442.

The method of determining the proper operation of the first fluid level detector assembly 430 will now be explained with respect to operation of the brake system 10. This diagnostic procedure may be run periodically throughout the life of the brake system 10. For example, this diagnostic may be run by the ECU 22 at every ignition cycle if so desired. The diagnostic may be run during operation of the vehicle or when the vehicle is at rest, such as upon a power up or power down cycle. The plunger assembly 18 is ideally suited for use in this diagnostic since the ECU 22 can operate the plunger assembly 18 to provide the necessary source of pressurized fluid. Preferably, the brake system 10 is first operated such that the first plunger valve 250 is energized to its open position, while the second plunger valve 252 is operated to its deenergized state. The simulator valve 180 and the simulator test valve 186 are operated to their deenergized positions, as shown in FIG. 1. The dump valves 52, 56, 60, and 64 are also operated to their deenergized positions, as shown in FIG. 1. The apply valves 50, 54, 58, and 62 are energized to their closed positions. The first isolation valve 30 is energized to the position permitting fluid flow from the conduit 34 to the conduit 40. However, the apply valves 50 and 54 are energized preventing fluid to flow to the wheel brake 12*a* and 12*b*. The second isolation valve 32 is operated to its deenergized position, as shown in FIG. 1. As discussed above, the isolation valves 30 and 32 may be mechanically designed such that flow is permitted to flow in the reverse direction (from the conduit 34 to the conduits 36 and 38, respectively) when in their de-energized positions and can bypass the normally closed seat of the valves 30 and 32. Thus, with the second isolation valve 32 being operated in the deenergized state, fluid can flow from the conduit 34 (from the plunger assembly 18) to the conduit 38.

To begin the diagnostic testing, the ECU 22 then operates the plunger assembly 18 to provide a source of pressurized fluid to the reservoir 20. More specifically, the ECU 22 energizes the motor 314 of the plunger assembly 18 to drive the piston 306 forwardly compressing the first pressure chamber 340. Fluid flows out of the pressure chamber 340 into the conduits 254, through the first and second plunger valves 250 and 252. Pressurized fluid from the conduit 34 is directed through the second isolation valve 32 in a bypassed manner, as described above, and into the conduit 38. If the master cylinder 14 is in its unactuated state, as shown in FIG. 1, fluid from the conduit 38 is directed into the primary chamber 94. From the primary chamber 94, fluid can flow through the passageway 104 of the primary piston 84 and into the conduit 106. From the conduit 106, the pressurized fluid is directed through the port 408 and into the eductor 460. As described above, pressurized fluid flow into the eductor 460 will cause fluid to flow from the passageway 458 into the eductor 460 (similar to the secondary fluid inlet 506 of the eductor 500). Fluid flow from the passageway 458 draws fluid in from the bottom portion of the guide tube 442 causing a low pressure region to develop moving the float 440 downwardly. During this diagnostic, the ECU 22 then monitors and makes sure that the sensor assembly 454 indicates that the movement of the float 440 has triggered the sensor assembly 454. If the sensor assembly 454 senses movement of the float 440, it is determined that the first fluid level detector assembly 430 is functioning properly. If the sensor assembly 454 is not triggered, the ECU 22 can display an alert for the operator of the vehicle indicating that there a malfunction.

The method of determining the proper operation of the second fluid level detector assembly 432 will now be explained with respect to operation of the brake system 10. Preferably, the brake system 10 is operated such that the first plunger valve 250 is energized to its open position, while the second plunger valve 252 is operated to its deenergized state. The simulator valve 180 is operated to its deenergized position, as shown in FIG. 1. The simulator test valve 186 is operated to its deenergized position, as is shown in FIG. 1. The dump valves 52, 56, 60, and 64 are operated to their deenergized positions, as shown in FIG. 1. The apply valves 50, 54, 58, and 62 are energized to their closed positions. The second isolation valve 32 is energized to the position permitting fluid flow from the conduit 34 to the conduit 42. However, the apply valves 58 and 62 are energized preventing fluid to flow to the wheel brake 12*c* and 12*d*. The first isolation valve 30 is operated to its deenergized position, as shown in FIG. 1. As discussed above, the isolation valves 30 and 32 may be mechanically designed such that flow is permitted to flow in the reverse direction (from the conduit 34 to the conduits 36 and 38, respectively) when in their de-energized positions and can bypass the normally closed seat of the valves 30 and 32. Thus, with the first isolation valve 30 being operated in the deenergized state, fluid can flow from the conduit 34 (from the plunger assembly 18) to the conduit 36.

To begin the diagnostic testing for the second fluid level detector assembly 432, the ECU 22 then operates the plunger assembly 18 to provide a source of pressurized fluid to the reservoir 20. More specifically, the ECU 22 energizes the motor 314 of the plunger assembly 18 to drive the piston 306 forwardly compressing the first pressure chamber 340. Fluid flows out of the pressure chamber 340 into the conduits 254, through the first and second plunger valves 250 and 252. Pressurized fluid from the conduit 34 is directed through the first isolation valve 30 in a bypassed manner, as described above, and into the conduit 36. If the master cylinder 14 is in its unactuated state, as shown in FIG. 1, fluid from the conduit 36 is directed into the secondary chamber 96. From the secondary chamber 96, fluid can flow through the passageway 134 of the secondary piston 86 and into the conduit 136. From the conduit 136, the pressurized fluid is directed through the port 404 and into the eductor 478. Similar to the eductor 460, pressurized fluid flow into the eductor 478 will cause downward movement of the float 470 at the lower portion of the guide tube 472. During this diagnostic, the ECU 22 then monitors and makes sure that the sensor assembly 474 indicates that the movement of the float 470 has triggered the sensor assembly 474. If the sensor assembly 474 senses movement of the float 470, it is determined that the second fluid level detector assembly 432 is functioning properly. If the sensor assembly 474 is not triggered, the ECU 22 can display an alert for the operator of the vehicle indicating that there a malfunction.

Although the reservoir 20 of the brake system 10 is shown with two separate fluid level detector assemblies 430 and 432, the reservoir 20 could be configured with a single eductor and single float to detect both a low fluid indication and a more severe or critical low fluid indication. Any suitable combination and number of sensors and switches could be used to detect travel of the float past one or more sensors and switches.

It may also be desirable to include relatively small holes or passageways formed through the lower portion of the eductors 460 and 478 near the ports 408 and 404, respectively, so that the usable fluid level of the reservoir 20 is not dictated by the height of the eductors 460 and 478 (at the outlet of the eductors). It is noted that these relatively small holes may be configured such that they will have little to no effect on the low fluid pressure required to move the floats downwardly. In another embodiment, the eductors 460 and 478 may be mounted horizontally rather than vertically as shown in FIG. 4.

One of the advantages of the fluid level detector assemblies 430 and 432 is that they function as mechanisms which act on the floats 440 and 470 hydraulically such that fluid forces directly act against the floats 440 and 470 as opposed to physical rods or other structures contacting the float, as in some conventional fluid level detector assemblies. This reduces the parts necessary to move the floats during a diagnostic procedure. It is also noted that while the fluid level detector assemblies 430 and 432 use differential pressure forces to push the floats 440 and 470 downwardly, other types of mechanisms may be used to direct a stream of pressurized fluid directly at the floats to cause their movement. Such a mechanism which also causes movement of the float hydraulically is described below with respect to FIG. 7.

Figure 7:
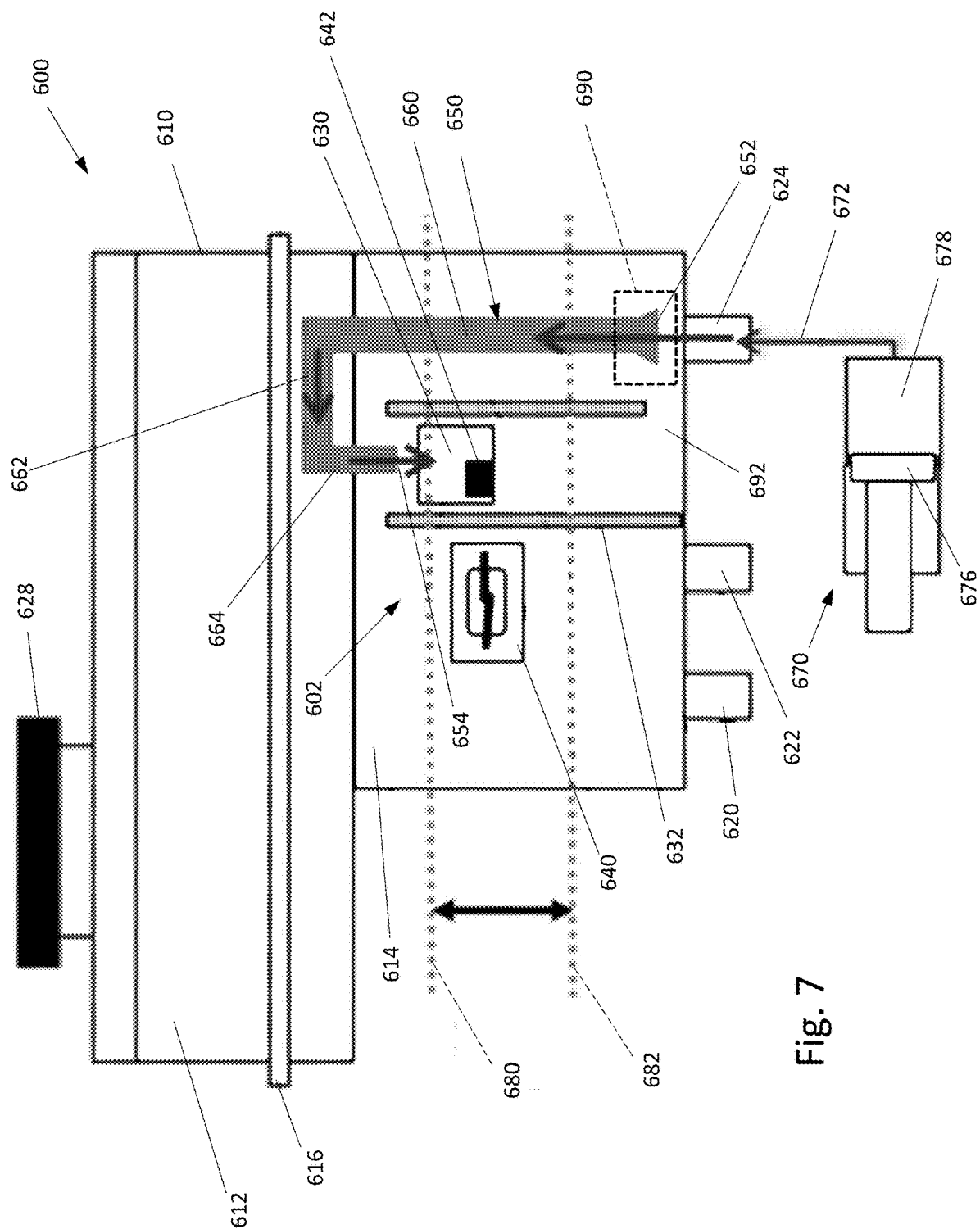
FIG. 7 is an enlarged cross-sectional illustration of an alternate embodiment of a fluid reservoir which may be used in the brake system of FIG. 1.

There is schematically illustrated in FIG. 7 an alternate embodiment of a fluid reservoir, indicated generally at 600. The reservoir 600 may be used in place of the reservoir 20 of the brake system 10 described above. As will be explained below, the reservoir 600 utilizes a different mechanism for determining the proper operation of a fluid level detector assembly 602 as compared to the reservoir 20.

The reservoir 600 includes a hollow main body or tank, indicated generally at 610, for holding a volume of brake fluid. In the embodiment shown, the tank 610 may be made of an upper portion 612 and a lower portion 614 which are connected together such as at a welding plane 616 fusing the upper portion 612 to the lower portion 614. Of course, the tank 610 may be made by any suitable manner and with any suitable materials. The tank 400 may include three ports, indicated schematically at 620, 622, and 624. The ports 620, 622, and 624 may function in a similar manner as the ports 404, 406, and 408 described above and may be connected to the conduits 24, 136, and 106 if the reservoir 600 is incorporated into the brake system 10. The tank 610 may also include first and second separator walls (not shown) forming three distinct lower fluid chambers within the interior of the tank 610. A removable cap 628 provides access to the interior of the tank 610 for filling. The cap 628 may also be designed for providing and maintaining atmospheric pressure within the interior of the tank 610.

The fluid level detector assembly 602 includes a buoyant float 630 which is slidably housed and guided within a guide tube 632. The float 630 and the guide tube 632 may be similar in structure and function as the float 440 and the guide tube 442 of the reservoir 20. The fluid level detector assembly 602 further includes a sensor assembly, indicated schematically at 640. The sensor assembly 640 can be any suitable mechanism that detects the movement and/or position of the float 630 relative to the tank 610. As discussed above with respect to the reservoir 20, determining the position of the float 630 corresponds to the fluid level within the tank 610. In the embodiment shown, the float 630 includes a magnetic and/or metallic element 642 that is sensed by the sensor assembly 640 as the float 630 passes by.

The fluid level detector assembly 602 further includes a hollow connector tube, indicated generally at 650. As will be described below, the connector tube 650 directs a stream of pressurized fluid downwardly onto the float 630 to hydraulically move the float 630 during a diagnostic procedure to determine proper operation of the fluid level detector assembly 602. The connector tube 650 is located within the interior of the tank 610 and may be formed integrally therewith or as a separate component mounted within the tank 610. The connector tube 650 includes an inlet 652 and an outlet 654. In the embodiment of the connector tube 650 shown in FIG. 7, the connector tube 650 has a generally inverted "hook" or "J" shape and includes a vertically oriented first portion 660, a generally horizontally oriented second portion 662, and a vertically oriented third portion 665. The inlet 652 is located at the bottom portion of the first portion 660. The outlet 654 is located at the end lower portion of the third portion 664. Of course, the connector tube 650 may have any suitable shape.

To begin the diagnostic testing, a source of pressurized fluid, indicated generally at 670, is actuated to direct a jet or stream of relatively high pressure fluid, as represented by an arrow 672, into the inlet 652 of the connector tube 650. The inlet 652 may be accessed via the port 624. It is noted that the inlet 652 of the connector tube 650 is spaced from and located above the port 624 such that during normal operation of the reservoir 600 fluid can flow up from the port 624 into the interior of the tank 610. Likewise, fluid can flow from the interior of the tank 610 through the port 624 and into the conduit connected to the port 624. The source of pressurized fluid 670 can be any suitable mechanism, such as the plunger assembly 18, that can deliver a jet or stream of high pressure fluid stream to the inlet 652 of the connector tube 650. In the schematic example illustrated in FIG. 7, the source of pressurized fluid 670 includes a slidable piston/cylinder arrangement 676 for pressurizing a pressure chamber 678. Pressurized fluid flows through the connector tube 650 and is directed out of the outlet 654 such that the jet or stream of fluid flows out of the outlet 654 at such a velocity and pressure so as to push the float downward. The stream of fluid should have a sufficient flow velocity and pressure so as to sufficiently flow through the fluid within the interior of the tank 610 above the port 624 and into the connector tube 650. Fluid directed through the connector tube 659 exits the outlet 654 and strikes the float 630, thereby causing the float 630 to move downwardly in the guide tube 632 past the sensor assembly 640 such that the sensor assembly 640 is triggered. The sensor assembly 640 may be triggered in a similar manner as described above with respect to the sensor assemblies 454 and 474. Broken lines 680 and 682 represent a valid vertical positional range of the float 630, wherein the sensor assembly 640 may be triggered.

Optionally, the reservoir 600 may include an eductor, indicated schematically by a broken line box 690, which is positioned between the port 624 and the inlet 652 of the connector tube 650. The eductor 690 may be similar in structure and function as the eductor 500 described above. The eductor 690 may perform the same function as the eductors 460 and 478 such that as fluid flows through the eductor 690, a low fluid pressure region 692 is created of the guide tube 632 such that the higher fluid pressure above the float 630 moves the float downwardly. Thus, the float 630 is being acted on by a combination of a pushing force from above by the volume of fluid directed at the float 630 exiting the connector tube 650, as well as the pressure differential caused by the low pressure region 692 introduced by the eductor 690.

With respect to the various valves of the brake system 10, the terms "operate" or "operating" (or "actuate", "moving", "positioning") used herein (including the claims) may not necessarily refer to energizing the solenoid of the valve, but rather refers to placing or permitting the valve to be in a desired position or valve state. For example, a solenoid actuated normally open valve can be operated into an open position by simply permitting the valve to remain in its non-energized normally open state. Operating the normally open valve to a closed position may include energizing the solenoid to move internal structures of the valve to block or prevent the flow of fluid therethrough. Thus, the term "operating" should not be construed as meaning moving the valve to a different position nor should it mean to always energizing an associated solenoid of the valve.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A fluid level detector assembly used to determine the level of fluid in a tank, the assembly comprising:

a float slidably mounted within a guide tube disposed within the tank and the float corresponding to the level of fluid within the tank;

a sensor assembly for detecting movement of the float; and a mechanism for causing movement of the float hydraulically;

wherein the mechanism hydraulically moves the float by creating low fluid pressure below the float in a lower portion of the guide tube such that higher fluid pressure above the float pushes the float downwardly, and the mechanism includes an eductor having an inlet connected with a source of pressurized fluid, and wherein the eductor has an outlet directing fluid into the tank, and wherein the eductor further includes at least one secondary inlet positioned adjacent the lower portion of the guide tube.

2. The assembly of claim 1, wherein the source of pressurized fluid is a plunger assembly.

3. The assembly of claim 1, wherein the sensor assembly senses the float by a sensor detecting a magnetic element which is attached to the float.

\* \* \* \* \*